Nov. 5, 1957 R. G. PEARSON 2,812,300
ELECTROLYTIC REGENERATION OF ION EXCHANGE RESINS
Filed Feb. 7, 1956
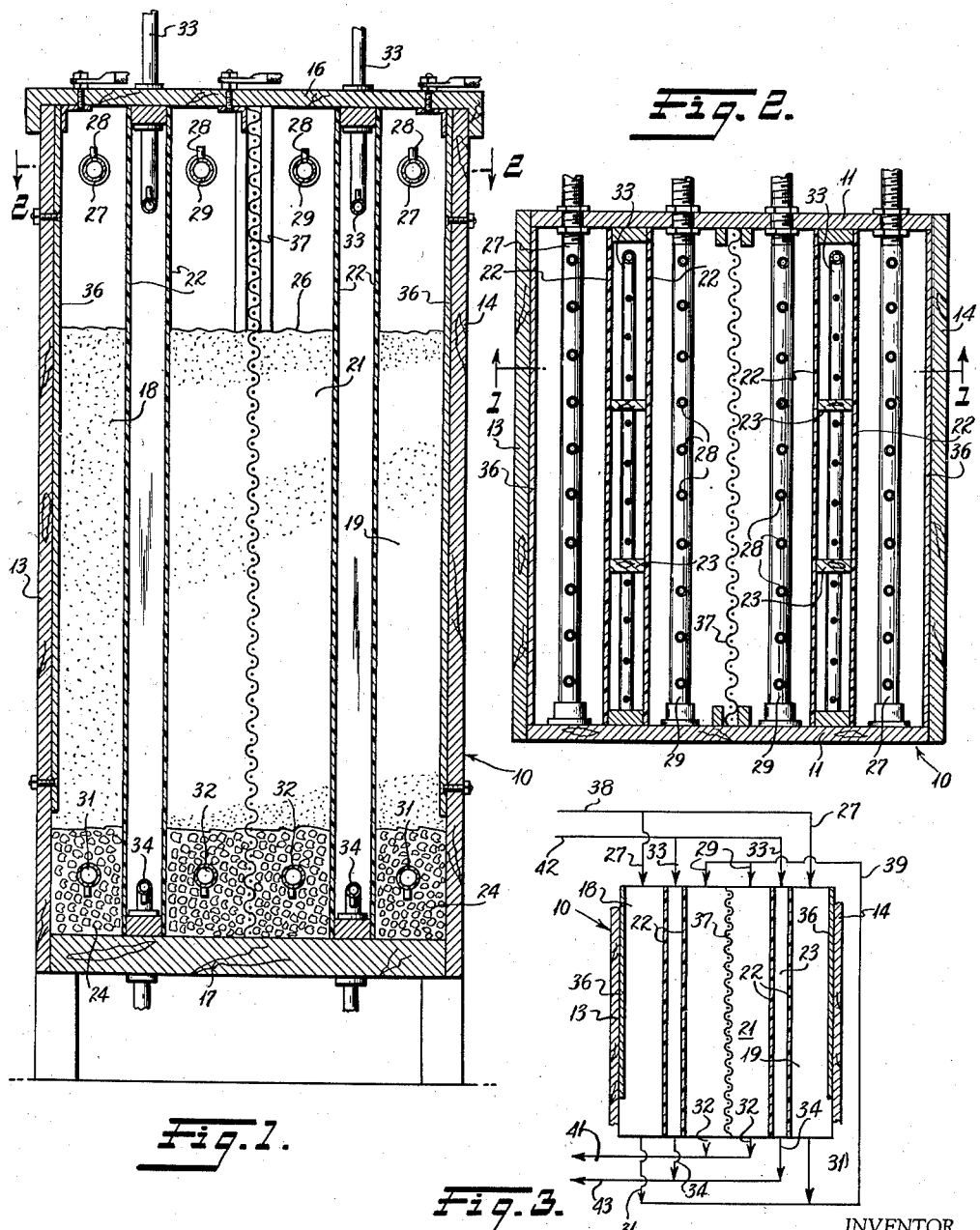
INVENTOR
RALPH G. PEARSON
BY
ATTORNEYS

United States Patent Office 2,812,300
Patented Nov. 5, 1957

2,812,300

ELECTROLYTIC REGENERATION OF ION EXCHANGE RESINS

Ralph G. Pearson, Chicago, Ill., assignor to Clayton Manufacturing Company, El Monte, Calif., a corporation of California Application February 7, 1956, Serial No. 563,871

9 Claims. (Cl. 204—151)

This invention relates to the electrolytic regeneration of ion exchange materials and more particularly to a process in which both cation and anion exchange materials are employed to remove electrolytes from solution in a solvent in which the electrolytes ionize and the exhausted materials are then regenerated electrolytically so as to enable them to be employed to remove further amounts of electrolyte from the solution.

Organic anion and cation exchange materials, particularly ion exchange resins, may be employed for removing electrolytes from polar solvents. They have been extensively employed for removing electrolytes from water in processes known as desalting, demineralizing or deionizing. In these processes the water containing the electrolyte in solution has been flowed through a mixed bed of the two types of resins or through a bed of cation exchange resin and then through a bed of anion exchange resin or vice versa until the resins are exhausted. The exhausted cation exchange resins have then been regenerated by passing an acid solution therethrough and the anion exchange resins have been regenerated by passing an alkaline solution therethrough. In mixed bed operations the resins must be separated prior to regeneration. The necessity of employing regenerating solutions, including the expense of storage tanks, etc., has added considerably to the cost of processes employing ion exchange resins.

In the present application the specific description will be directed largely to the removal of electrolytes from water, although the principles disclosed are applicable to any solution of electrolyte in a solvent in which it ionizes, and the terms "deionizing" or "deionization" will be employed to mean the removal of electrolytes from any of such solutions, including aqueous solutions.

In accordance with the present process, beds of anion and cation exchange materials are positioned adjacent each other and electrodes are placed in contact with such beds. That is to say, an anode is placed in contact with the side of the bed of cation exchange material opposite the anion exchange material and a cathode is placed in contact with the side of the bed of anion exchange material opposite the bed of cation exchange material. The beds of the two materials are separated from each other by permeable diaphragms, two diaphragms spaced from each other being employed so as to provide a space or channel between the diaphragms separating the beds. The electrodes are not energized during the deionizing treatment. The solution being deionized is first flowed through the bed of one type of material and then through the bed of the other to remove electrolyte from the solution and exhaust the resins. The resins may then be regenerated by stopping the flow of solution and connecting the anode and cathode to a suitable source of direct current power while a conducting solution is present in the resins and in the channel between the diaphragms. Hydrogen cations produced at the anode will replace other cations on the cation exchange resin and the replaced cations from the resin will migrate through the diaphragm into the channel between the diaphragms. In a similar manner, hydroxyl anions produced at the cathode will replace other anions on the anion exchange resin and such other anions will also migrate into the channel between the diaphragms. The result is a solution containing the replaced anions and cations in the channel or space and this solution may be continuously or intermittently removed from the exchange apparatus to leave regenerated anion and cation exchange resins.

Further solution to be deionized may then be flowed through the resin beds to remove electrolyte therefrom until the resins are exhausted. The flow of electrolyte solution being deionized may then be stopped and the resins electrolytically regenerated as discussed above.

It is, therefore, an object of the present invention to provide an improved process of regenerating ion exchange materials in which the ion exchange materials are regenerated electrolytically after being employed to remove electrolytes from solutions thereof.

Another object of the invention is to provide an improved process for removing dissolved electrolytes from ionizing solutions thereof in which the solution being treated is flowed through beds of active cation and anion exchange resins positioned adjacent each other and the resins are regenerated by passing electric current through the beds in series from an anode in contact with the bed of cation exchange resin and a cathode in contact with the bed of anion exchange resin.

Another object of the invention is to provide an improved ion exchange resin apparatus containing both anion and cation exchange resins in which both types of resins are regenerated electrolytically when exhausted.

Other objects and advantages of the invention will appear in the following description of suitable apparatus shown in the attached drawing, of which:

Fig. 1 is a vertical cross-section of ion exchange apparatus taken on the line 1—1 of Fig. 2;

Fig. 2 is a horizontal cross-section of the apparatus of Fig. 1 taken on the line 2—2 of Fig. 1; and Fig. 3 is a schematic diagram of the apparatus of Figs. 1 and 2 indicating the flow of solutions therethrough.

Referring more particularly to the drawing, the apparatus of Figs. 1 and 2 may include a treating chamber 10 having end walls 11 and 12, side walls 13 and 14, and top and bottom walls 16 and 17. The various walls of the chamber 10 may be of insulating material or may be lined with a layer of insulating material. For many treating operations, wood is a suitable material for the various walls as it has sufficient insulating properties with the low voltages required in the present process.

The chamber illustrated in Figs. 1 and 2 is divided into three main compartments, including two cation exchange resin compartments 18 and 19 and a single central anion exchange resin compartment 21 by means of pairs of permeable diaphragms 22. The diaphragms 22 of each pair may be spaced from each other by a plurality of spacers 23, preferably of insulating material such as wood. All of the ion exchange resin compartments 18, 19, and 21 may have their lower portions partly filled with graded aggregate 24, such as gravel or coal particles, as is known in the art. The cation exchange resin compartments 18 and 19 may then be filled with particles of cation exchange resin up to a level 26, leaving a substantial space above the resin beds and, similarly, the anion exchange resin compartment 21 may be filled with anion exchange resin particles up to the same level 26.

The diaphragms 22 may be made of any suitable, permeable material which will saturate with water or other solvent being deionized and will permit the migration of ions therethrough while preventing rapid passage of the solutions therethrough. The material of the diaphragms should of course be resistant to attack by the electrolyte in solution in the solvent. Heavy canvas is suitable for most purposes and the same is true of various other fabrics, such as fabrics of many synthetic fibers. Sheets or plates of porous ceramic or other materials may also be employed.

An electrolyte solution to be treated may be introduced into the cation exchange resin compartments 18 and 19 through pipes 27 provided with a plurality of upwardly extending nozzles 28, and, similarly, electrolyte solution may be introduced into the anion exchange resin compartment 21 through pipes 29 also provided with nozzles 28. The treated solution may be withdrawn from the cation exchange resin compartments 18 and 19 through pipes 31 and from the anion exchange resin compartment 21 through pipes 32, the pipes 31 and 32 being positioned within the graded aggregate in the various compartments. Also, conducting solution may be introduced into the channels or spaces 23 between the diaphragms 22, through pipes 33, and withdrawn therefrom through pipes 34.

Anodes 36 may be suitably secured to the side walls 13 and 14 so as to be in contact with the outer surfaces of the beds of cation exchange resin and a central cathode 37 may be positioned centrally of the chamber 10 so as to divide the bed of anion exchange resin 21 into two parallel portions and make contact with the two portions. The anodes 36 may be of any suitable material which is electrically conducting and resistant to corrosion by acids. Plates or sheets of carbon or graphite are suitable, although in many cases stainless steel may be employed. The cathode also may be of any suitable electrically conducting material which is resistant to alkalies, ordinarily iron or steel being suitable, although, again, stainless steel may be employed. The cathode is illustrated as being of wire cloth or screen, although it is apparent that a solid or perforated sheet may be employed. While a chamber showing two cation exchange compartments and a single central anion exchange compartment has been illustrated, it is apparent that a greater number of anion and cation exchange compartments may be provided, the intermediate compartments having their electrodes positioned centrally within their beds of ion exchange materials.

Fig. 3 illustrates one method of flowing the electrolyte solution to be treated through the treating compartments of the chamber of Figs. 1 and 2. Although the present invention is applicable to solutions of any electrolyte in substantially any ionizing solvent therefor, the present invention has its chief utility in removing electrolytes from water, and the specific discussion of Fig. 3 will be restricted to treating water solutions with ion exchange resins. Water to be treated and containing an electrolyte in solution may be supplied through a pipe 38 and introduced into the cation exchange resin compartments 18 and 19 through pipes 27. After passing through the cation exchange resin beds in these compartments, it may be discharged through the pipes 31 and delivered through the pipe 39 to the pipes 29 for introduction into the anion exchange resin compartment 21. It may be discharged from the anion exchange resin compartment 21 through pipes 32 and pipe 41. That is to say, the arrowheads on various pipes 27, 31, 29, 32 and 41 in Fig. 3 show the normal direction of flow of the water being treated during the deionization of such water.

If it is assumed that the process starts with active cation exchange and anion exchange resins, such cations as sodium, magnesium or calcium cations, replace hydrogen cations in the cation exchange resin. Sodium, magnesium or calcium cations are thereby removed from the water and an acid solution is discharged from the cation exchange resin compartments. This acid water is then flowed through the anion exchange resin compartment 21. In this compartment, anions such as chloride and sulfate anions, replace hydroxyl anions. The replaced hydroxyl anions combine with the hydrogen cations present to form water and a substantially neutral water may be discharged from the anion exchange resin compartment 21.

When the resins become exhausted by substantially complete replacement of the hydrogen cations in the cation exchange resin and substantially complete replacement of the hydroxyl anions in the anion exchange resin, the supply of water through the pipe 38 is stopped and an electric potential is applied between the anodes 36 and the cathode 37. Hydrogen cations are produced at the anodes 36 by electrolytic action and these hydrogen cations replace such cations as sodium, magnesium and calcium cations in the cation exchange resin in the compartments 18 and 19. The replaced cations migrate toward the cathode by progressive replacement of other cations in the resin and through the water in the interstices between the resin particles into the channels 23 between the diaphragms 22. Similarly, hydroxyl anions are produced at the cathode 37 by electrolytic action and replace such anions as chloride and sulfate anions in the anion exchange resin. The replaced anions migrate toward the anodes into the channels 23. During the regeneration treatment, the level of water in the compartments 18, 19, and 21 is preferably maintained in the channels 23. The water in the channels 23 may be substantially any conducting solution of electrolyte and may be the same as the water introduced into the process through the pipe 38. The electrolyte removed from the ion exchange resins by electrolytic action concentrates in the channels 23 and water may be slowly flowed therethrough by introducing water from the pipe 42 and pipes 33 into the channels 23 and withdrawing water therefrom through the pipes 34 and the pipe 43. Any replaced cations which may enter the anion exchange material have no effect thereon and may be removed by a subsequent rinsing step, if desired, and the same is true of any replaced anions which may migrate into the cation exchange material. At the end of the regenerating step, the channels 23 may be completely filled with water to balance water in the compartments 18, 19 and 21 which are also preferably maintained substantially full of water during the demineralization step and any rinsing or backwashing steps.

Although the employment of the channels 23 between the diaphragms 22 provides an effective means of removing replaced cations and anions from the treating chamber since water may be either continuously or intermittently flowed therethrough out of substantial contact with the resin beds during the regeneration step, it is entirely possible to omit the channel and employ a single diaphragm 22 between the beds. Water can then be flowed slowly through both of the beds during the regeneration step to remove the replaced anions and cations and, if desired, the subsequent rinsing step referred to above can be employed to remove remaining replaced anions or cations after the electric current has been discontinued.

At the end of the demineralization step and prior to the electrolytic regeneration step just discussed, it is usually desirable to backwash the resin beds in order to remove therefrom any solid material filtered from the water by the ion exchange material during the demineralization step and to reduce packing of the beds. The pipes 31 and 32 in the various compartments may be employed for introducing backwash water by suitable pipe connections (not shown), the pipes 27 and 29 being employed for discharge of backwash water to waste by connections also not shown. Also, it may frequently be desirable to rinse the resins after the regeneration step prior to beginning the demineralization step and, again, the pipes 27 and 29 may be employed for introduction to rinse water and the pipes 31 and 32 employed for discharge of rinse water, the rinse water being ordinarily sent to waste. Such backwashing and rinsing operations are conventional in the art and need not be further described.

The process of the present invention is applicable to substantially any type of cation and anion exchange materials such as ion exchange resins, such resins being well-known to the art. The process, however, works with greatest efficiency upon so-called "strong" cation exchange resins, for example, resins of the sulfonic acid type, and "strong" anion exchange resins, for example, the quaternary ammonium type of anion exchange resins. It is theoretically possible to completely regenerate such resins electrolytically. The hydrogen cations produced at the anode, however, have much greater mobility than the cations they replace in the cation exchange resin, and, similarly, the hydroxyl anions produced at the cathode have considerably greater mobility than the anions they replace in the anion exchange resin. Hydrogen cations and hydroxyl anions, therefore, begin to reach the space 23 or at least meet each other at points intermediate the anode and cathode in considerable numbers during the latter part of the regeneration step without replacing other cations in the resin. These ions react with each other to form water, and the current carried by these ions is ineffective for regeneration purposes. As the regeneration of the resins begins to approach completion, the efficiency of the regeneration step, therefore rapidly decreases. Complete regeneration may, therefore, require excessive power consumption, such that electrolytic regeneration will ordinarily not be carried beyond that sufficient for practical purposes. An adequate degree of regeneration may be electrolytically effected without the employment of acid and alkaline regeneration solutions, although it is entirely possible to substantially complete the regeneration by supplementing the electrolytic regeneration with regeneration by regenerating solutions. Even in this case, the amount of regenerating solutions required is very much reduced, i. e. by approximately 60 to 80%.

In treating water containing both alkali metal and polyvalent metal ions, such as calcium and magnesium, the solution adjacent the cathode during the electrolytic regeneration treatment may become sufficiently alkaline to precipitate compounds of magnesium or calcium which are insoluble in the alkaline solution. Such precipitates will, of course, contaminate the resin bed, and although such precipitates may ordinarily be removed by the backwash above described, it is many times preferable to soften the water so as to remove calcium and magnesium ions prior to the demineralization treatment of the present invention. This may be accomplished, for example, by first treating the water to be demineralized in the cathode compartment of a two-compartment electrolytic cell such as disclosed in the patents to Briggs No. 2,341,356 granted February 8, 1944, and No. 2,535,035, granted December 26, 1950. The electrolytic softening treatment of the Briggs patents is particularly desirable as it also reduces the total electrolyte content of the water. Other softening treatments, such as cation exchange using zeolites and operating on the sodium cycle, may also be employed to exchange calcium and magnesium ions for sodium ions without reducing the total electrolyte content. Any softening treatment employed prior to the steps of the present invention does, however, increase the efficiency of the regeneration treatment, since such polyvalent metal ions as calcium and magnesium cations are, in general, less mobile than alkali metal cations and more difficult to remove from exhausted cation exchange material.

As pointed out above, the electrolyte solution may be substantially any electrolyte in solution in a solvent in which it ionizes, i. e. in a polar solvent, it being understood that the ion exchange materials employed will be insoluble in the solvent but sufficiently permeable thereby to swell and ionize in the solvent as is known in the art.

*Example 1*

An electrolytic test cell was constructed from polymethyl methacrylate and was fitted with Dynel diaphragms to provide an anode chamber, a cathode chamber, and a middle chamber. The chambers were approximately cubical in dimensions, and were approximately of the same size. A platinum anode was placed in the anode chamber, a platinum cathode was placed in the cathode chamber, and electrical connections were made to provide direct current flow between the anode and cathode. The cell set-up is illustrated in the following diagram:

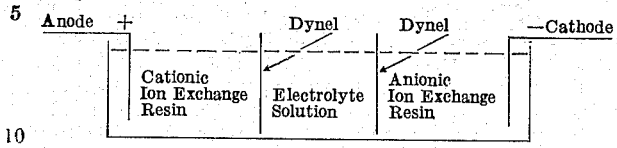

A portion of resin beads of a commercially available "strong acid" cationic resin of the nuclear sulfonic acid type, known as "Dowex-50," was exhausted into a sodium form by treatment with 0.5 molar sodium sulfate solution. Approximately 30 ml. of the exhausted Dowex 50 cationic resin were placed in the anode chamber of the electrolytic cell in direct contact with the platinum electrode. A portion of the resin beads of a commercially available "strong base" anionic resin of the amine type known as "Amberlite IRA-400 was exhausted into the sulfate form by similar treatment with 0.5 molar sodium sulfate solution. Approximately 30 ml. of the exhausted IRA-400 anionic resin were placed in the cathode chamber of the cell in direct contact with the platinum electrode therein. The cell was now filled with an aqueous solution containing 1500 p. p. m. of sodium sulfate so that the level of solution in each of the three chambers was just above the top of the resin beds. Approximately 80 ml. of sodium sulfate solution were required. The amount of resins used provided resin beds in the form of a cube approximately 3 cm. on an edge. Electrolysis was then carried out at 6 volts with an average current of 0.012 amp. for 54 hours.

After such treatment, an analysis of the ion exchange material was made in the following manner to determine the degree of regeneration. The regenerated cationic resin (Dowex-50) was removed from the cell and was washed free of electrolytic solution and electrolytic products. This material was then treated with 50 ml. of 0.5 molar sodium sulfate solution in the manner used to exhaust the resin initially. After filtration and washing of the resin, the resultant solution was titrated with standard alkali. The amount of hydrogen ion picked up by the resin during electrolysis was thereby determined. The regenerated anionic resin from the cell was similarly treated with 50 ml. of 0.5 molar sodium sulfate solution in the manner previously used to exhaust this resin, and the filtered solution was titrated with standard acid to determine the degree of regeneration of hyroxyl ion. The electrolytic efficiency was calculated from the measured expenditure of electric energy and the exchange capacity actually regenerated. The results are summarized as follows:

|  | Dowex-50 | IRA-400 |
| --- | --- | --- |
| Percent of resin regenerated | 19.3 | 33.5 |
| Regeneration efficiency, percent | 55.7 | 34.5 |

From the foregoing example, it is apparent that regeneration of exhausted cationic resin and of the exhausted anionic resin may be simultaneously accomplished electrolytically even without flow of solution through the middle chamber to carry away replaced cations and anions migrating into this chamber.

*Example 2*

A "weak acid" cationic resin of the carboxylic acid type known as "Amberlite IRC-50," and a "strong base" anionic resin, Amberlite IRA-400 (as used in Example 1) were employed in the 3-compartment electrolytic cell set-up illustrated in Example 1. The anionic exchange resin IRA-400 was exhausted as in Example 1 by treatment with 0.5 molar sodium sulfate solution, and approximately 30 ml. of this resin were placed in the cathode compartment of the electrolytic cell. The cationic resin, IRC–50, was exhausted with 2 molar sodium hydroxide and approximately 30 ml. of the exhausted resin were placed in the anode compartment of the cell. The cell was now filled with an aqueous solution containing 1500 p. p. m. of sodium sulfate so that the level of solution in each of the three chambers was just above the top of the resin beds. Approximately 80 ml. of sodium sulfate solution was required. Electrolysis was carried out at an average current of 0.010 ampere for 45 hours at 6 volts. After electrolysis, an analysis of the extent of regeneration of the anionic resin IRA–400 was made in the same manner as described in Example 1. The cationic resin IRC–50 was treated with a portion of 2 molar sodium hydroxide solution in the manner used initially to exhaust it. This solution was filtered off and titrated with standard acid to determine the extent of the regeneration of the resin by hydrogen ion. The results are summarized as follows:

|  | IRC–50 | IRA–400 |
| --- | --- | --- |
| Percent of resin regenerated | 25.9 | 9.4 |
| Regeneration efficiency, percent | 91.1 | 14.3 |

From the foregoing example, it may be seen that appreciable regeneration of exhausted "weak acid" cationic resin and "strong base" anionic resin may be simultaneously accomplished by electrolysis.

The foregoing examples employed a static solution in all compartments of the electrolytic cell. The following example illustrates improvements in the simultaneous regeneration of the resins by flowing a solution through one or more chambers of the cell during electrolysis to carry away cations and anions replaced from the resins.

*Example 3*

An electrolytic cell was constructed of polymethyl methacrylate and was provided with anode and cathode chambers 2″ x 2″ x ¾″ and with a middle chamber of the same dimensions, separated one from another by two Dynel diaphragms. Platinum electrodes 2″ square were mounted on the end plates of the cell so that the respective resins could entirely fill the space between the electrodes and Dynel diaphragms. The middle chamber was provided with inlet and outlet tubes so that its contents could be changed by continuous flow. The cell set-up is illustrated diagrammatically as follows:

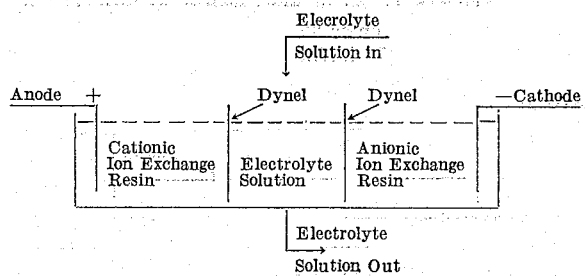

Utilizing the cell set-up as illustrated, two ion exchange resin systems were studied. (1) "Strong acid"—"Strong base" (Cationic IR–120—Anionic IRA–400), and (2) "Weak acid"—"Strong base" (cationic IRC–50—anionic IRA–400). Before each test, the ion exchange resins were exhausted by treatment over a period of several hours with a twofold excess of either hydrochloric acid (for the anion exchange material) or sodium hydroxide (for the cation exchange material). After thorough washing to remove the excess acid or base, the resin was transferred to the appropriate chamber of the cell. Sufficient resin was packed into the chamber to cover the electrode, and in each case about 30 grams of resin was required.

New York city tap water was used to fill the electrolytic cell, and was permitted to flow through the middle chamber at a rate of 40 ml. per hour, completely flushing the chamber over a period of about 1½ hours. Electrolysis was conducted so that cationic resin was regenerated to hydrogen form in the anode chamber, and the anionic resin was regenerated to hydroxyl form in the cathode chamber. Current was maintained at 10 and 15 ma., and runs of 23, 41, and 71 hours were made. In each run, the electrolysis was continued only long enough to provide partial regeneration, assuming 100 percent current efficiency. At the end of a run, the resins were thoroughly washed and the regenerated capacity determined by standard technique, i. e. by addition of excess HCl or NaOH and back-titration of the unused acid or base, as the case may be. From the anion or cation exchange capacity regenerated and the electrical energy consumed, the efficiency of the electrolytic regeneration process was calculated. Results are as follows:

| Resin | Time of Electrolysis (hr.) | Current (ma.) | Regeneration Efficiency, percent |
| --- | --- | --- | --- |
| Cationic IRC–50 | } 23 | 10 | { 185 |
| Anionic IRA–400 | | | 40 |
| Cationic IR–120 | } 41 | 10 | { 70 |
| Anionic IRA–400 | | | 51 |
| Cationic IRC–50 | } 71 | 15 | { 143 |
| Anionic IRA–400 | | | 39 |

The regeneration efficiency of IRC–50 in each experiment was well over 100%. This was probably due to partial regeneration of the resin by the carbon dioxide dissolved in the flowing tap water. From the foregoing runs it is demonstrated that exhausted anionic and cationic exchange resins can be simultaneously regenerated in situ at a high degree of efficiency by electrolysis in a three-compartment cell.

*Example 4*

The following example illustrates the simultaneous regeneration of adjacent beds of anionic ion exchange material and cationic ion exchange material without the use of a middle chamber separating such beds. An electrolytic cell was constructed of polymethyl methacrylate to provide a two-chamber cell in which the ion exchange beds were separated by a partition of heavy filter paper. In one chamber was placed a bed of anionic ion exchange resin IRA–400 which had previously been exhausted to sulfate form. A negative electrode (cathode) was placed at the extreme end of this chamber in direct contact with the exhausted resin. In the other compartment was placed a bed of cationic exchange resin, IR–120, which had previously been exhausted to sodium form. A positive electrode (anode) was placed in the extreme end of this chamber in direct contact with the resin. Both electrodes were of platinum. Both chambers were now filled with 4 percent sodium sulfate solution with the level of solution in these beds being just equal to the height of the resin bed. The cell set-up is illustrated by the following diagram:

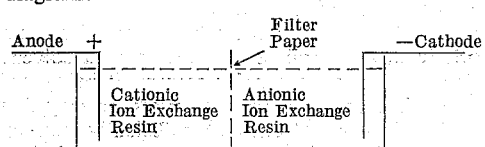

Electrolysis was now carried out at 6 volts with an average current of 0.060 amp. for 31 hours. After the duration of the run, the regeneration efficiency was determined as follows: A weighed portion of each of the regenerated resins was treated with 50 ml. of 4 percent sodium sulfate (the same solution which was used to exhaust the resins initially). The resultant solutions which now contained hydrogen and hydroxyl ions respectively, were titrated with standard base and acid. As a result of the analysis, it was found that the actual degree of regeneration of the cationic resin, IR-120 was 50 percent, and that the electrical regeneration efficiency for this resin was 88.4 percent. The actual degree of regeneration for the anionic resin, IRA-400, was found to be 41.1 percent with an electrical regeneration efficiency of 28.8 percent.

It is to be pointed out that the values of both degree of regeneration and the regeneration efficiency will depend to some extent upon the physical dimensions of the electrolytic cell. Thus, a cell having resin chambers with a high ratio of length to cross-sectional area will exhibit high regeneration efficiencies because of the long path that the hydrogen and hydroxyl ions generated at the respective electrodes must transverse before meeting each other and combining to form water.

This application is a continuation-in-part of my copending application, S. N. 286,410, filed May 6, 1952, now abandoned.

I claim:

1. The method of electrolytically regenerating exhausted ion exchange resins, which comprises, passing a direct electric current from an anode through a bed of exhausted cation exchange resin, then through a space defined by spaced permeable diaphragms separating said bed of cation exchange resin from a bed of exhausted anion exchange resin and containing no ion exchange material and then through said bed of exhausted anion exchange resin to a cathode while said beds and space contain an aqueous conducting solution, whereby hydrogen cations produced at said anode replace other cations in said cation exchange resin and hydroxyl anions produced at said cathode replace other anions in said anion exchange resin, and flowing said conducting solution through said space to remove replaced anions and cations from said space to leave at least partly regenerated cation and anion exchange resins.

2. The method of removing electrolyte from a solution of said electrolyte in an ionizing solvent, which comprises, passing said solution in series through separate beds of active cation exchange material and anion exchange material separated from each other by a permeable diaphragm whereby ions in said solution replace hydrogen cations in said cation exchange material and hydroxyl anions in said anion exchange material to exhaust said materials and remove electrolyte from said solution, discontinuing the series flow of solution through said beds, passing a direct electric current from an anode adjacent said bed of cation exchange material through said bed of cation exchange material, then through said diaphragm and then through said bed of anion exchange material to a cathode adjacent said bed of anion exchange material while said beds contain an ionizing solvent for said ion exchange materials, whereby hydrogen cations produced at said anode replace other cations in said cation exchange material and hydroxyl anions produced at said cathode replace other anions in said anion exchange material, removing solvent containing the replaced anions and cations to leave at least partly regenerated cation and anion exchange material, and again flowing said solution through said beds in series to remove electrolyte therefrom.

3. The process as defined in claim 2, in which said solution is first flowed through said bed of cation exchange material and then through said bed of anion exchange material.

4. The process as defined in claim 2 in which said solution is first flowed through said bed of anion exchange material and then through said bed of cation exchange material.

5. The process as defined in claim 2 in which the replaced ions are concentrated in a solution in a space defined by a pair of spaced permeable diaphragms separating said beds and said last named solution is removed from said space.

6. Apparatus for removing dissolved electrolyte from solution in a solvent in which said electrolyte ionizes, which apparatus comprises, a container, a permeable diaphragm dividing said container into a cation exchange compartment and an anion exchange compartment, a bed of cation exchange material in said cation exchange compartment and a bed of anion exchange material in said anion exchange compartment, conduit means for passing said solution first through one of said beds and then through the other of said beds, an electrode in said cation exchange compartment on the opposite side of said bed of said cation exchange material from said diaphragm, an electrode in said anion exchange compartment on the opposite side of said bed of anion exchange material from said diaphragm, and means for energizing said electrodes with direct current to make said electrode in said cation exchange compartment an anode and said electrode in said anion exchange compartment a cathode.

7. Apparatus as defined in claim 6, in which two spaced permeable diaphragms are positioned between said beds of cation and anion exchange materials to divide said container into said anion exchange compartment and said cation exchange compartment, and in which means are provided for flowing a conducting solution through the space between said diaphragms.

8. Apparatus as defined in claim 6 in which a plurality of pairs of spaced permeable diaphragms divide said container into a plurality of compartments and in which electrodes in the intermediate compartments are positioned centrally thereof with a bed of ion exchange material on both sides of said last mentioned electrodes.

9. The method of removing electrolyte from a solution of electrolyte in an ionizing solvent, which comprises, passing said solution in series through separate beds of active cation exchange material and anion exchange material separated from each other by a space defined by a pair of spaced permeable diaphragms whereby ions in said solution replace hydrogen cations in said cation exchange material and hydroxyl ions in said anion exchange material to exhaust said materials and remove electrolyte from solution, discontinuing the series flow of solution through said beds, electrolytically regenerating said ion exchange materials by passing a direct electric current from an anode adjacent said bed of cation exchange material through said bed of cation exchange material and through said bed of anion exchange material to a cathode adjacent said bed of anion exchange material while said beds contain an ionizing solvent for said ion exchange materials and while flowing an ionizing solvent through the space defined by said spaced diaphragms, whereby hydrogen cations produced at said anode replace other cations in said cation exchange material and hydroxyl ions produced at said cathode replace other anions in said anion exchange material and the replaced cations and anions migrate into said ionizing solvent flowing through said space defined by said permeable diaphragms and are carried away by such solvent, discontinuing the electrolytic regeneration, and again flowing said electrolyte solution through said beds in series to remove electrolyte therefrom.

References Cited in the file of this patent

UNITED STATES PATENTS 2,057,232   Endell _____ Oct. 13, 1936

OTHER REFERENCES

"Science," vol. 113, No. 2941, May 11, 1951, Spiegler et al.